March 14, 1944.                C. J. LEUTHOLT                2,343,986
AIRFOIL CONTROL
Filed May 24, 1943                5 Sheets-Sheet 3
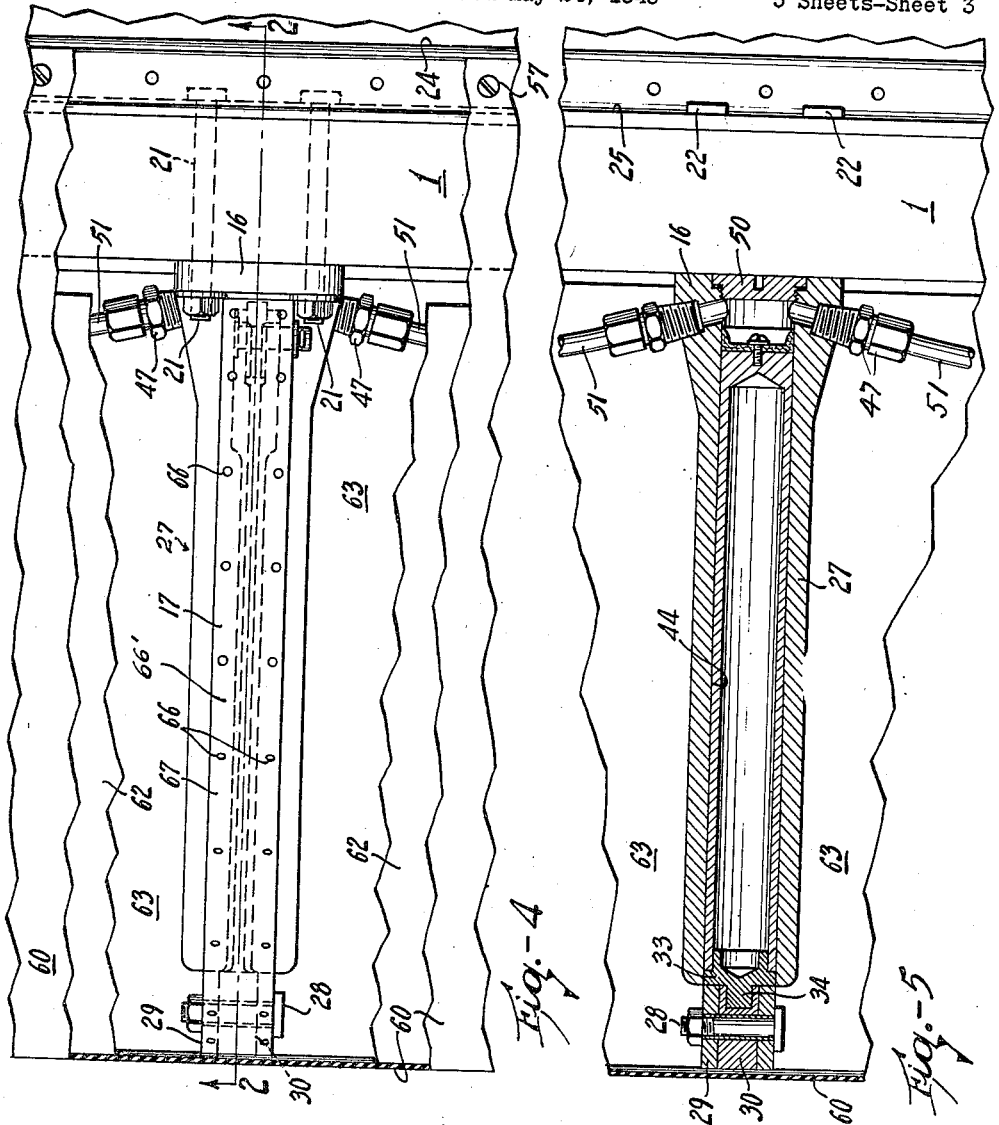
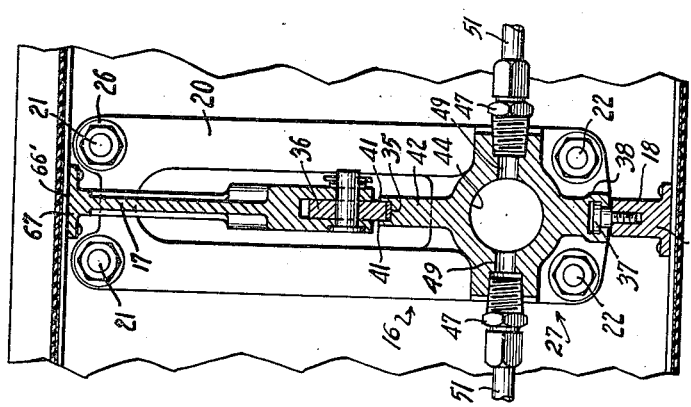
INVENTOR.
CLIFFORD J. LEUTHOLT
BY
ATTORNEY

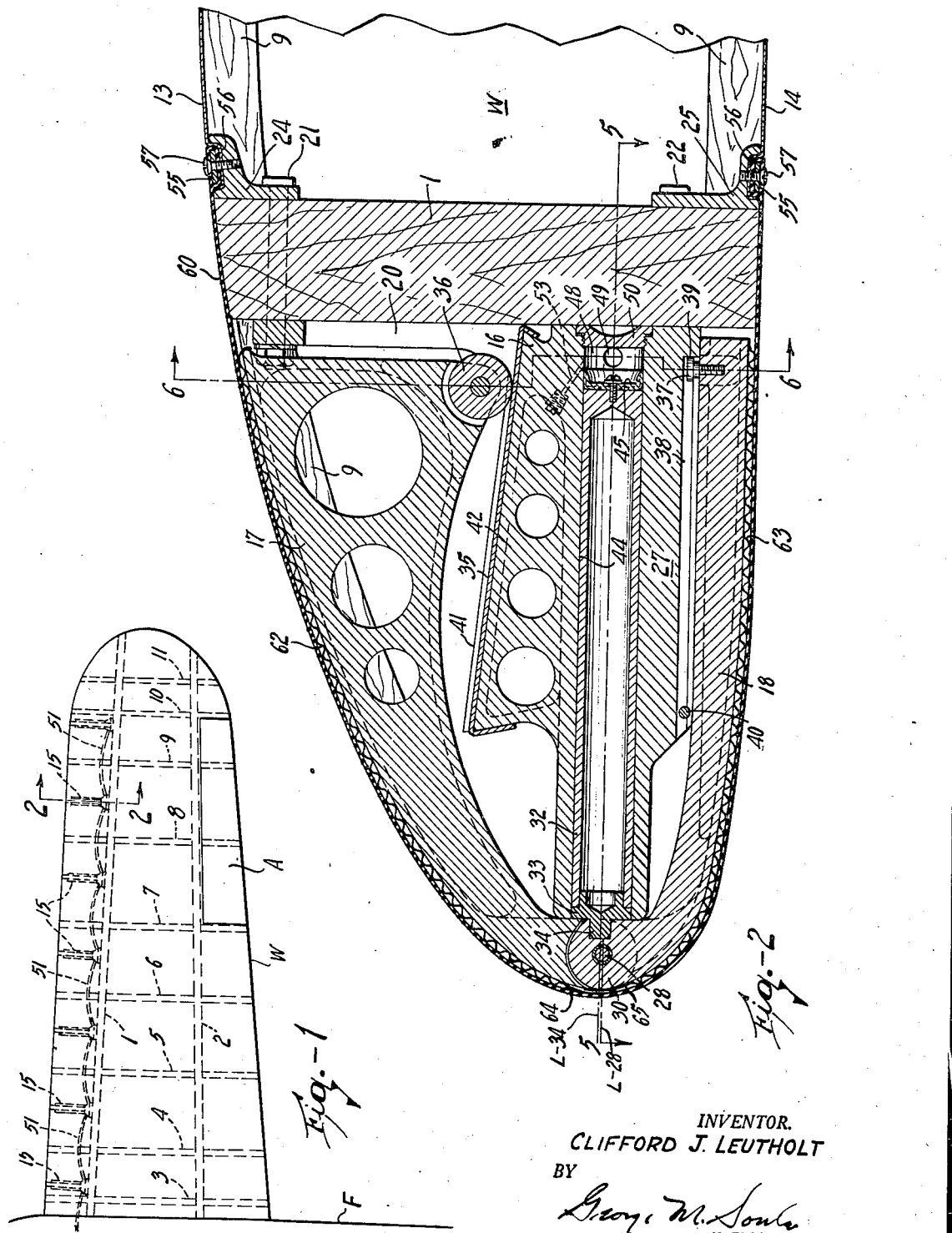

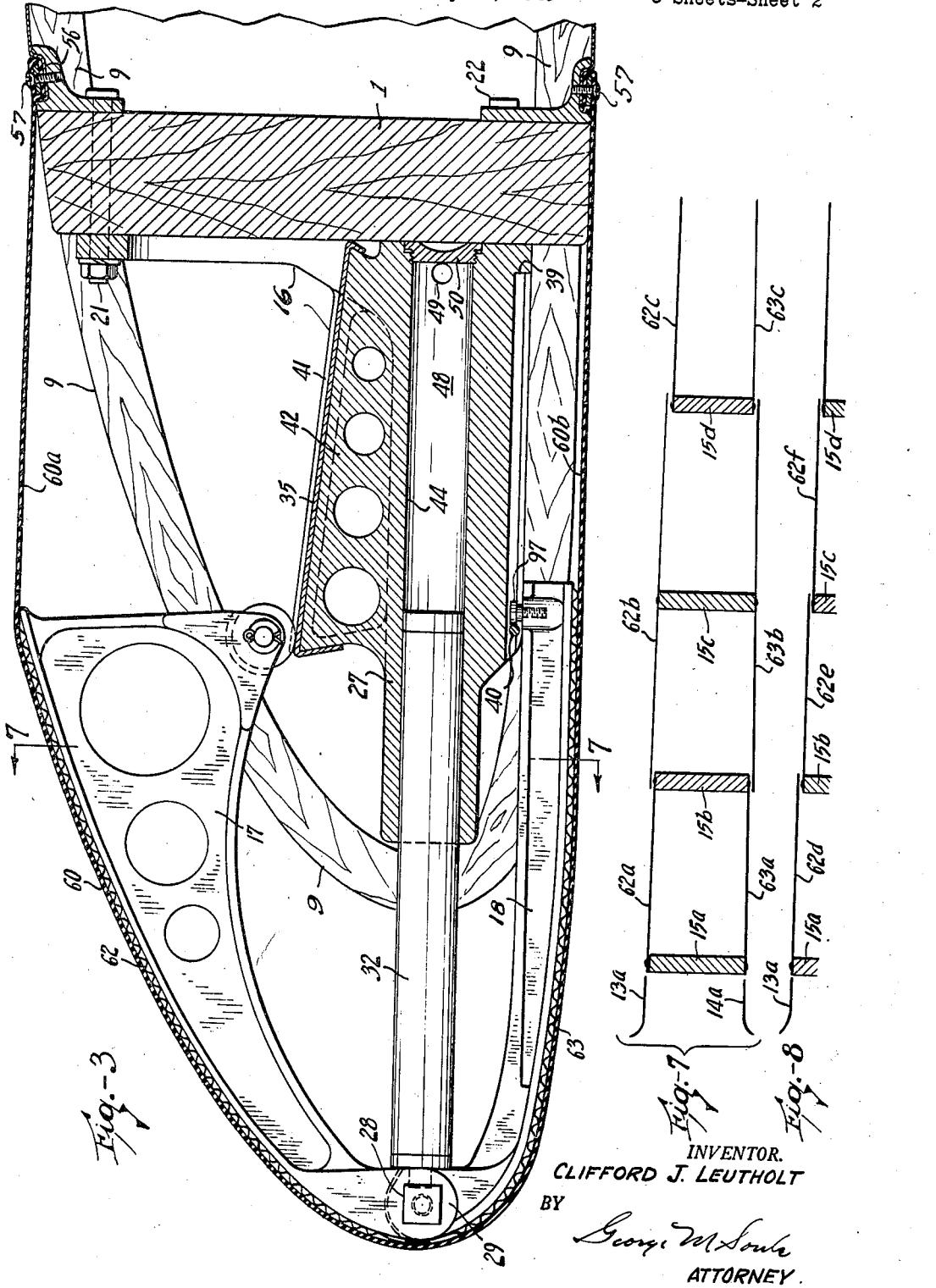

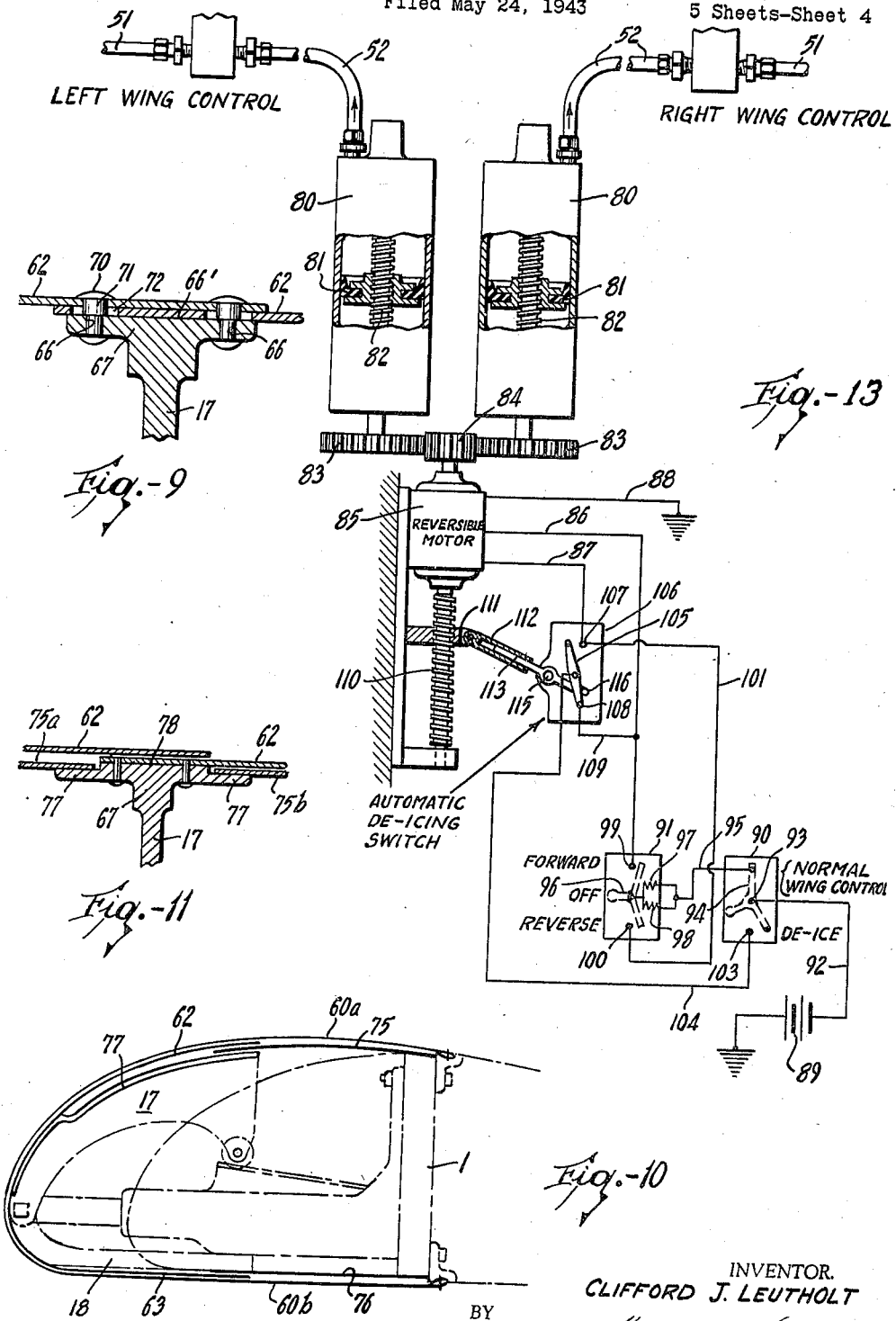

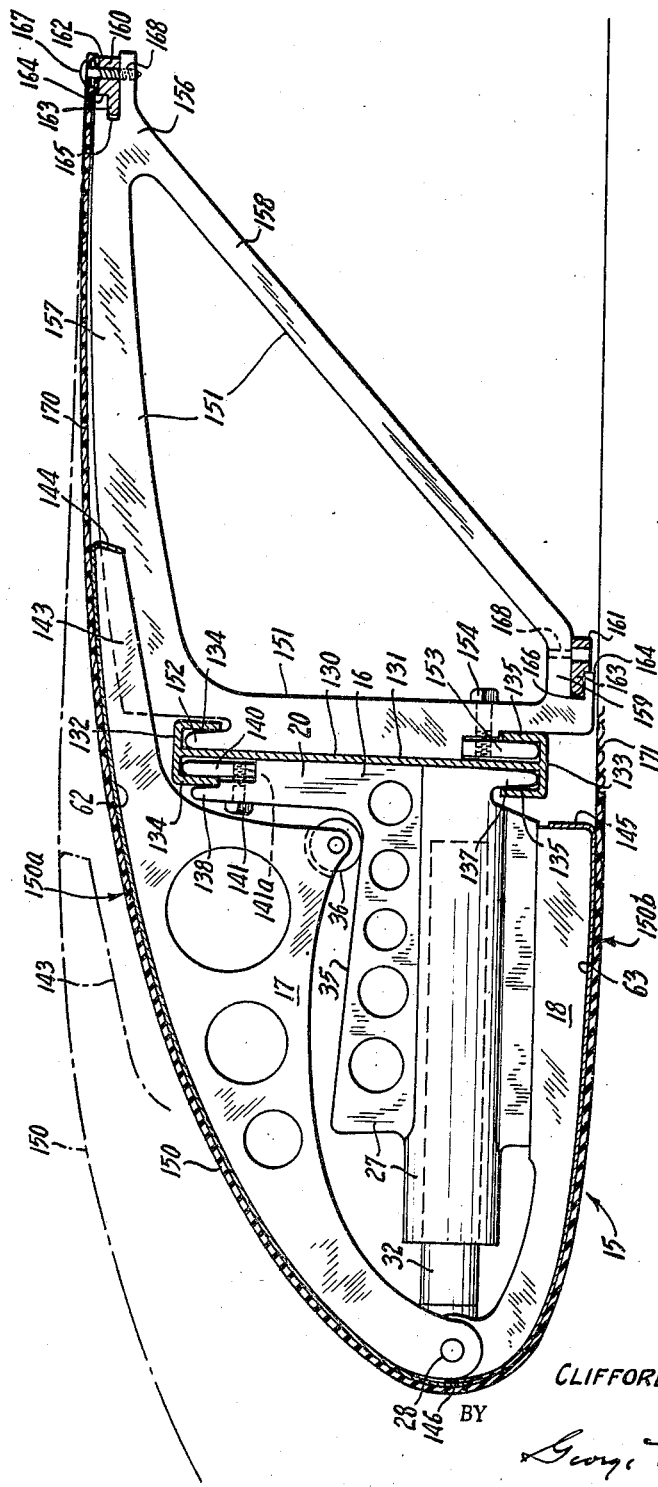

Patented Mar. 14, 1944

2,343,986

UNITED STATES PATENT OFFICE 2,343,986

AIRFOIL CONTROL

Clifford J. Leutholt, Taylor, Pa., assignor to The Marquette Metal Products Company, Cleveland, Ohio, a corporation of Ohio Application May 24, 1943, Serial No. 488,237

16 Claims. (Cl. 244—44)

This invention relates to an airfoil lift and speed control, including means for de-icing an airfoil.

The objects include the provision of an airfoil which is controllable as to the main chord and camber whereby to vary both in a desired ratio or ratios; an improved airfoil construction whereby the lift and speed characteristics can be altered while maintaining stability in flight and while maintaining continuous lift (camber) and thrust surfaces on the airfoil; an airfoil lift and speed control operable effectively also for de-icing purposes; and a hydraulically actuated mechanism for varying the chord and effective camber of an airfoil to change the lift and other characteristics as required for meeting different conditions of flight.

A further object is to provide an airfoil chord and camber adjustment applicable to substantially an entire leading edge portion of an airfoil without interfering with the strength, flexibility or stability thereof.

A further object is to provide an airfoil lift and speed control having means operative to vary the chord and effective camber and having smooth-surface-maintaining means operable to return the airfoil to normal or initial condition.

Still another object is to provide an airfoil leading edge control operable as a de-icer and in conjunction therewith a mechanism for adjusting the control for automatic reciprocating or other intermittent operation as for de-icing and for sustained operation in different adjusted positions.

A further object is to provide an electrically operated control arrangement for automatically operating a movable airfoil control section intermittently in a manner tending to de-ice the airfoil and for maintaining the airfoil in variable but normally fixed conditions of operation for lift and speed adjustment.

Other and more specific objects hereof will become apparent from the following description with reference to the accompanying drawings. The invention is shown in connection with an airplane wing as one illustrative example of an airfoil to be controlled or de-iced. In the drawings:

Fig. 1 is a more or less diagrammatic plan view of an airplane wing showing the general arrangement of airfoil control units hereof as applied to such wing;

Fig. 2 is a fragmentary cross sectional view of one of the airfoil control units taken substantially at 2—2 on Fig. 1;

Fig. 3 is a view similar to Fig. 2 showing a movable assembly of said control unit in relatively extended position as for changing lift and speed characteristics of the wings;

Fig. 4 is a fragmentary plan view, partly broken away in respect to covering portions of the airfoil adjacent one of the units mentioned;

Fig. 5 is a sectional detail plan view as indicated at 5—5 on Fig. 2;

Fig. 6 is a vertical sectional view generally longitudinally of the airfoil as indicated at 6—6 on Fig. 2;

Figs. 7 and 8 are mechanical diagrams showing respectively two different methods of applying reinforcing sheet or plate elements to the units mentioned above so as to constitute in a sense connecting parts for a plurality of said units;

Fig. 9 is a detail sectional view taken in a plane similar to that of Fig. 6 but shown in greater detail one manner of fastening skin supporting sheet or plate members to movable arm portions of the control units;

Fig. 10 is a mechanical diagram corresponding generally to Fig. 3 and showing a modification in the manner of supporting parts of a flexible looped blanket or skin element of the airfoil control mechanism on an airfoil structure;

Fig. 11 is a detail sectional view corresponding to Fig. 9 but illustrative of the manner of supporting the sheets or plates in a construction made according to Fig. 10;

Fig. 12 is a schematic or diagrammatic fragmentary view on the order of Fig. 10 showing a further modification in the construction, and Fig. 13 is a mechanical and electrical diagram showing one manner in which the mechanism hereof can be adjusted and operated for lift and speed control and also de-icing through hydraulic or other fluid pressure operated means.

Various methods have been proposed to vary the lift and speed characteristics of airfoils on aircraft. A number of those proposals comprise movable airfoil-surface-supporting sections including variable leading edge or nose portions. An important feature of the present improvement in the art is that with the present arrangement the mean chord and effective camber of true or nearly true airfoil shape can be maintained in desired ratios tending toward stability in flight notwithstanding considerable variation in lift, speed and other values. Another point of improvement resides in the fact that with the present arrangement the adjustability of the lift characteristics is not accompanied by any appreciable or deleterious turbulence because the lift and thrust surfaces are maintained uninterrupted or continuous. Also, in the preferred form of the invention, the lift controlling mechanism operates as a very simple but efficient means for de-icing the airfoil, and the capability of de-icing requires no added installation cost.

The above are merely the salient points of advantage, there being many others as will hereinafter appear.

Referring to Fig. 1, representing the right wing W of an airplane attached to a fuselage F, as viewed from above the ship, it is assumed that the wing has the usual longitudinal forward and rear spars as diagrammatically indicated at 1 and 2 and a suitable number of fore and aft rib assemblies or units indicated consecutively from 3 to 11 and extending from leading to trailing edge at the top and bottom surface supporting portions of the wing. It may be assumed that the ribbing and other well known parts of the wing construction are conventional and subject to considerable modification and that the embodiments of the present invention would be correspondingly modified in adapting it to different types of construction.

For illustrative purposes only, the spars 1 and 2 will be assumed to be continuous wooden strips of adequate strength and shape extending substantially the entire depth of associated regions of the wing and throughout the length of the wing. For convenience, the wing structure including and behind the forward spar 1 will be considered a fixed, trailing airfoil portion or section and the mechanism involving the present improvement positioned forwardly of the spar 1, for example, supported mainly or wholly thereby will be termed a leading, movable airfoil portion or section, the top surface of which will be referred to as the lift or camber surface and the bottom the thrust surface. The wings would, of course, have the usual ailerons, one being suggested at A, or equivalent flight control means mounted on the fixed or trailing wing portion in suitable fashion. The usual covering for the fixed wing frame structure, for instance fabric or metal envelopes the framework—top and bottom portions of the covering being indicated at 13 and 14 respectively.

The airfoil lift and speed control and de-icer construction includes units which are essentially alike and all of which on Fig. 1 are indicated at 15, said units being mounted on respective forward portions of the spar 1 and preferably between the various rib units 3 to 11 at sufficient uniformly spaced intervals to provide the necessary strength and stability for the movable wing section assembly constituted in part thereby.

Said units 15 as brought out particularly in Figs. 2 to 6 comprise substantially rigid bracket members 16, upper movable arm members 17 and lower movable arm members 18. Only one of the control units 15 will be described in detail.

Referring to Figs. 2 and 3, it is noted that the bracket 16 has an attaching base 20 secured flatwise against the forward face of the spar 1 as by upper and lower bolts 21 and 22 with detachable nuts. The bolts in the particular construction shown also attach strip members 24 and 25 to the rear face portions of the spar 1 adjacent the upper and lower regular covering fabric or sheet elements 13 and 14 which are secured in part by said strips as will be apparent from Figs. 2 and 3. The shape of the base portion 20 is best seen in Fig. 6 wherein it will be noted that the same is generally rectangular, providing bosses 26 for supporting the bolts 21 and 22 at the four corners affording a strong balanced pedestal construction for the bracket 16. Extending forwardly from the base between the reaches of the arms 17 and 18 is a strong, substantially rigid, cantilever member or bracket portion 27 best shown in Figs. 2, 3, and 5. The bracket 16 and arms 17 and 18 may be aluminum castings or made of plastics or other strong but light weight structural material.

The movable arm members 17 and 18 are curved on their upper and lower surfaces respectively so as to support forward airfoil cover elements normally contiguous to and substantially merging with the skin elements 13 and 14 heretofore mentioned in a manner to avoid gaps and projections such as might produce "spoiler" effects or create undesired turbulence. The special forward airfoil covering and forward skin structure generally will be described later. The arm members 17 and 18 further are preferably of inherently stiffened structural section for example, I beam or T form apertured (optionally) to reduce weight and as made clearly apparent particularly by Figs. 2 and 3.

The arm members 17 and 18 are articulated and supported forwardly of the assembly by a hinge pin 28 extending horizontally through relatively overlapped ear portions 29 and 30 of the respective arms. As shown, the arm 18 has a single ear 30 centrally of the bracket 20 and the arm 17 is bifurcated to provide double ears 29 straddling the ear 30. The pivotal support for the arms further includes the forward end of a plunger 32 of a hydraulic mechanism, to be described later, said plunger being generally tubular as shown in Fig. 2 to reduce weight and having a plug 33 fixed in its outer or forward end. The plug has a reduced pin portion 34 entering a socket in the central or middle ear 30 of the pivot construction. The axis (see center line L-28) of the pin 28 preferably lies somewhat below the axis (center line L-34) of the projection 34, so that the air pressure occurring as the wing moves forwardly tends always to lift the arms 18 through impact with the lower covering or surface elements connected with said lower arms, thus insuring contact of the arms 18 with the cantilever bracket portions in all operating positions and at all angles of attack. The arms 18 could, instead, have sliding interlock (e. g. dovetail) connections with the under sides of the brackets.

The arrangement further includes an inclined trackway 35 on the upper side of the cantilever portion 27 of the bracket 16 in the principal plane of the arm 17 and on which rides a wheel 36 or other suitable follower such, for instance, as a shoe not shown; and a guiding and travel-limiting connection between the arm 18 and the lower part of the bracket cantilever portion 27, which connection is constituted by a pin 37 extending upwardly from a rear portion of the arm 18 into a longitudinal slot 38 facing downwardly on the cantilever portion 27 of the bracket and along which the pin moves freely from a limiting abutment 39 at the rear of the slot to a limiting abutment 40 at the forward end thereof. To prevent the arm 18 from swinging downwardly out of the desired relationship with the bracket portion 27, the pin 37 may (as shown) have a head contained in a T portion of the slot 38.

The trackway 35, as shown, is formed by a strip of wear resisting metal, for instance spring steel, with downwardly and inwardly bent ends clasping complementary downwardly convergent surfaces at the ends of a raised rib 42 of the bracket, which rib has upstanding flanges 41 at each side of the strip to guide the roller.

The entire airfoil surface supporting nose assemblage constituted by the arms 17, 18, plunger 32 and other parts to be described later is arranged to be moved forwardly from the position shown in Fig. 2 to that shown in Fig. 3 and vice versa. As shown, pressure fluid in a chamber 48 formed in part by a cylinder bore 44 for the plunger 32 and in part by a sealing disc 45 on the plunger operates to project said assemblage toward or to the position shown in Fig. 3. The projection or forward movement of the upper arm 17, by reason of inclination of the track 35, results in the arm 17 being raised thus gradually increasing the depth (thickness) of the airfoil section near its forward part, and, because the camber surface curvature is not essentially changed, increasing the effective camber in proportion to the increase in chord and without "spoiler" effect. Because the proper ratio between camber and chord is substantially maintained, the airfoil is efficient and stable under all conditions of adjustment or control afforded hereby, assuming that the airfoil is properly designed to start with. The inclination of the cam or track 35 is at a somewhat greater degree than is ordinarily needed to preserve said ratios or secure outstanding differences in lift and thrust. With the particular arrangement shown in Figs. 2 and 3 there is less sacrifice of smoothness of airfoil curvature in the less extended positions of the assemblage than in the fully extended position least frequently used.

For supplying fluid (e. g.) oil to the cylinders constituted by the bores 44, all said bores are interconnected by tubing and appropriate fittings as shown, particularly in Figs. 1 and 4 to 6, inclusive. Oil pipe (union) fittings of conventional form are shown at 47 at opposite sides of each unit 15 and the threaded openings in the bracket 16 which receive end portions of the fittings communicate with the effective pressure chambers 48 of the cylinders as by passages 49. The rear portion of each cylinder may be closed as by a threaded plug 50 abutting the spar 1, Figs. 2 and 3. Air vents, for bleeding the hydraulic system of air at initial filling of the system with hydraulic fluid are provided in the various brackets 16 as at 53, which vents and provided with suitable screw plugs to close them after the system is fully charged.

Preferably the threaded openings which receive the fittings 47 are inclined forwardly from the bracket base 20 toward the cantilever portions of the brackets so that each connecting tube 51, which bridges the fittings 47 of adjacent units, is initially in the form of a simple curve arched forwardly as illustrated particularly on Fig. 1. Thus after the union connections exemplified by the fittings 47 are made, the tendency for the unsupported portions of the tubes to vibrate or rattle in a vertical plane can be greatly reduced or avoided simply by bending the intermediate portions of each arch toward the forward spar of the wing, thus placing a considerable degree of inherent compressive force in each span of tubing. Additionally, the tubing may be snugly covered as by tape or continuous non-metallic and non-resonant tube sections to reduce vibration or noise if desired or found necessary.

The manner in which fluid is supplied to the system of tubes of each of two wings and, in general, to any pair of airfoils will be described later in connection with Fig. 13 which shows two end supply sections of tubing at 52 leading to the units 15 which are adjacent the fuselage. Insofar as the broader aspects of the invention are concerned the hydraulic actuating means can be considered merely illustrative. The control could be mechanically, electrically or otherwise operated.

As noted in Fig. 2 the rearward outer surface portions of the upper and lower arms 17 and 18 terminate close to the upper and lower corners respectively of the spar 1, and, if desired, the rearward ends of the arms or suitable rigid or flexible extensions thereof could overlap and be supported by the spar or equivalent main brace or frame construction for a considerable distance in the normal (retracted) condition of the control units.

Extending across the top of the spar 1, along the upper curved surface of the arm 17, around the leading edge of the wing and then rearwardly across the curved surface of the lower arm and the lower surface of the spar 1, is an extensible and preferably elastic cover member or blanket 60 which, for convenience, may be attached at its respective ends to the strips 24 and 25. The strip 60 extends across all the units 15 and, if desired, somewhat therebeyond inwardly and outwardly longitudinally of the wing. The blanket member 60 is of strong highly elastic rubber, natural or synthetic. If necessary the rubber is suitably treated to resist weather and temperature influence as well known in the chemical arts.

In some cases I may use non-elastic material for the blanket 60 and in that case one or both ends of the blanket would be provided with tension take-up means, i. e. springs, rollers etc. inside the wing structure. Such construction requires slots in the wing skin structure and is therefore not preferred. The variant is mentioned as an example of a means for utilizing non-elastic material in performing at least some of the functions of the flexible elastic blanket.

A desirable manner of fastening the opposite ends of the looped flexible blanket 60 to the wing structure is illustrated on Fig. 2. Both end fastenings are the same hence one only will be described. The ends of the blanket may have grommet reinforcing strips as of flat steel or other suitable distortion-resisting material embedded therein, e. g. vulcanized in a complete fold of the rubber, indicated at 55; and the strips 24 and 25 have longitudinal troughs 56 receiving not only the regular skin fabric or covering sheets 12 and 13 respectively but also the grommet-reinforced trailing edge portions of the blanket 60. Thus appropriate sets of screws 57 may penetrate the grommet structure of the blanket at holes in the reinforce strips 55 and may also penetrate the skin fabric 13 or 14 underlying the same for engagement with aligned, pre-arranged threaded openings in the mounting strips 24 and 25 for holding the blanket in place and initially in tension.

For supporting the looped portion of the flexible member 60 between the arms 17 and 18 suitable plate such for example as corrugated or smooth metal sheets 62 and 63 are supported by said arms in bridging relation to adjacent arms lengthwise of the wing generally and normally supported also by the regular ribbing 3—11 where overlying and underlying such ribbing. Each plate 62 is secured by fasteners such as rivets at holes 66, Fig. 2—as will be more fully described later—to at least one of the arms 17 of the units 15. The plate 62 shown in Figs. 2 and 3 extends forwardly along the outer curved surface of the arm 17 into overlapping relation to the hinge joint formed by the ears 29 and 30. The corrugated part of the plate (if corrugated) terminates forwardly near the region of the joint and then a short smooth portion 64 of the plate 62 overlaps a short smooth portion 65 of the lower plate 63. These smooth overlapping portions of the plates are not secured together or to the relatively underlying arms 17 and 18. The plate 63 is secured to the arm 18 in the same manner as the plate 62 is secured to the arm 17. The plates rest on or against the outer curved surfaces 66' of respective arms constituted by oppositely flanged heads 67 of the arms—see Fig. 6.

In Fig. 7 (Sheet 2 of drawings), the units 15 are indicated, for illustrative convenience, diagrammatically as mutually parallel rectangular members 15a, 15b, 15c and 15d. The upper and lower plates 62a and 63a nearest the normal wing skin element portions, designated 13a and 14a which merge with the fuselage skin structure, may be rigidly secured to two adjacent units as 15a and 15b at the arms 17 and 18 thereof, more or less continuously along the longitudinal curved edge surfaces of said arms as explained above. The next or contiguous supporting plates indicated diagrammatically at 62b and 63b overlap (or underlap) the secured marginal edges of the plates 62a and 63a but are not rigidly connected thereto or to the associated arms 17 and 18 of the unit 15b but are rigidly connected to the next set of arms outwardly along the wing, for example to the arms of unit 15c. The plates 62b and 63b are secured only to the unit 15c and the margins of said plates 62b and 63b lying outwardly from the unit 15c toward the wing tip overlap the arms of the unit 15d and overlap (or underlap) the adjacent margins of the next set of plates 62c and 63c but without being secured either to said arms of 15d or to the next set of plates 62c and 63c. The overlapped (or underlapped) margins of the plates 62c are secured, however, to unit 15d. The construction continues as just described to the last unit, outwardly toward the wing tip.

Thus the assemblage of units 15 are physically bridged by the plates 62 and 63 from end to end of the airfoil lift control assembly but the wing may, nevertheless, flex freely as required in flight without buckling the plates. The semifloating plate attachment construction is absent from the assembly constituted by the units 15a, 15b and connecting plates 62a and 63a, but it is ordinarily not necessary to provide for full wing flexibility except at certain regularly or normally flexing portions or regions of the wings, which normally flexing portions can be readily determine by wing constructional characteristics as well known in the art.

Another way of associating the plates 62 and 63 with the various units 15 is suggested in Fig. 8 wherein the plate 62d is connected as by rivets etc. to the unit designated 15a but not to 15b, the plate 62e is so connected to the unit 15b but not to 15c and the unit 62f is connected to the unit 15c but not to 15d, and so on to the end of the assembly.

The arrangement according to Fig. 8 would offer less resistance to flexing of the wing at all points but, in general, would require dividing the supporting plate construction constituted by the corrugated or other members 62 and 63 into smaller or narrower sections than would the procedure according to Fig. 7.

One manner of securing the plates 62 and 63 to the associated arms 17 and 18 in keeping with Figs. 7 and 8 is shown in Fig. 9 (Sheet 4 of the drawings) wherein the upper one of two plates 62, the margins of which overlap the flanged head 67 on the arm 17, is secured by shank portions 71 of rivets 70. The shank portions 71 are shouldered against the surface 66' so as to limit or avoid pressure of the heads against the overlying plate 62. The underlying plate 62 has holes or elongated slots 72 sufficiently larger than the shanks 71 in directions longitudinally of the wing so that the underlying plate 62 may slide as described above when the wing flexes and not buckle or warp the plate structure. The plates 63 would be similarly secured to the lower arms 18.

A modified arrangement as to the supporting plates for the elastic blanket 60 is illustrated more or less schematically or diagrammatically in Fig. 10 and in detail in Fig. 11. When the pivoted arm assembly of the units are moved forwardly as illustrated by Fig. 3, portions 60a and 60b become unsupported by the plates 62 and 63 respectively. Such lack of support is unimportant since the rubber or other stock of which the blanket 60 is formed can be made sufficiently strong and under sufficient tension to withstand the pressure and suction applied thereto during flight. Also the blanket can have non-stretching portions (as by internal reinforcing cord or fabric) in the regions where it becomes at times unsupported by the plates 62 and 63.

If desired, as suggested by Fig. 10, auxiliary supporting plates as at 75 and 76 can be attached at their rearward ends to the forward spar structure, indicating element 1 of Figs. 1 to 3, and provision may be made on top of the flanged head portions 67 of the two arms 17 and 18 so that the unsecured leading edge margins of the plates 75 and 76 are guided for sliding under and over the trailing marginal portions of the plates 62 and 63 respectively. Obviously, such a construction would be better adapted to the use of smooth blanket supporting plates 62 and 63 instead of the corrugated plates illustrated by Figs. 2 and 3.

Fig. 11 shows two adjacent auxiliary supporting plates 75a and 75b slidable on flange extensions 77 of the head portion of, for example, arm 17. A raised platform portion 78 of the flanged head is made to support the overlapped marginal edges of two adjacent plates 62 which, in the particular arrangement shown, are representative of, for example, the plates 62d and 62e of Fig. 8 or the right hand portion of the plate 62b and left hand portion of plate 62c in Fig. 7. The plates 75 in order to provide a curved supporting surface for the upper blanket portion 60a (Fig. 3 or 10) preferably would be of light sheet metal with considerable spring strength and inherent arch; and it will be observed from Fig. 10 that when the interconnected arms 17 and 18 slide rearwardly, the arch of the plates 75 will be modified as necessary for return of the assembly toward the forward spar by the guiding recesses afforded between the plates 62 and flange extensions 77. The lower auxiliary plate 76 can also have a slight downward initial arch so that the plate 76 will remain in snug contact with the otherwise unsupported blanket portion 60b, if desired, so as to resist upward air pressure in the extended position of the assembly 17, 18 etc.

In addition to the support afforded for the flexible or elastic blanket 60 by the arms 17 and 18 and associated plates 62 and 63, it is to be understood that the regular ribbing 9 of the wing which ordinarily extends in a bow forwardly of the spar 1 is left intact and in operative supporting contact with the plates 62 and 63 or auxiliary plates such as 75 and 76 of Fig. 10, if used. Similarly, if desired in re-vamp installations, practically all the fabric or other covering normally on the wing may be left on such forwardly bowed portions of the ribbing ahead of the forward spar, it being only necessary to slit the covering at various places to enable insertion and securement of the control unit brackets 16. Similarly the mounting strips 24 and 25 for the trailing edges of the blanket 60 and regular cover fabric can be inserted and secured, if in short sections, simply by making short slits in the fabric at each bay and spreading the fabric at the slits—later resealing. In case the present arrangement is applied to a new installation it is, of course, unnecessary to do any slitting of fabric since the fabric would be applied to the framework as a final operation.

Any suitable means can be provided to decrease the friction between the elastic blanket 60 and its support so that the blanket will stretch uniformly or perhaps more readily in certain regions than others. Any known lubrication methods can be used, or, for instance, closely spaced small rollers at critical regions between the blanket and its support. The corrugations of the sheets or plates 62 and 63 have certain advantages in decreasing effective friction on the blanket.

The arrangement shown by Fig. 12 (Sheet 4 of the drawings), which view corresponds in general to Fig. 2, results in the maintenance of a somewhat more perfect or at least conventional airfoil shape of the wing in extended positions of the arm assemblies 17, 18, etc. of the units 15. In Fig. 12 the parts that correspond essentially to parts shown in the previously described figures are indicated as in those figures.

The forward spar, 130 in Fig. 12, is a more or less standard extruded metal section in the nature of an I-beam having a central web 131 and T-head flanges 132 and 133 with inturned parallel flange portions 134 and 135. The airfoil control units 15 are attached to the forward portion of said spar as by the base portions 20 of the brackets 16 by a special arrangement adapted particularly to such extruded spar sections as shown. Near the bottom of the bracket base 20 is a depending lug 137 which is so shaped as substantially to be easily inserted into snug fitting position in the space between the web 130 and the foremost flange portion 135. During assembly, after the lug has been inserted as mentioned, the bracket 16 is then swung upwardly and rearwardly into the position shown with an upper lug 138 of the bracket resting against the foremost upper flange 134 of the strut. Clamping pieces are provided for each of the brackets 16 as at 140 which clamping pieces, positioned as shown, engage the inner surfaces of the foremost flange 134 so as to be drawn tightly thereagainst. Clamping screws 141 enter threaded openings in the clamping pieces 140 to cause gripping of said flange 134 as will be apparent.

The upper T-head 132 is, as usual in metal spar wing constructions, spaced a considerable distance below the plane of the adjacent skin structure of the wing so that it is well below the position of the adjacent region of the supporting sheet 62 shown in this case as a smooth sheet (not corrugated). The space is sufficient so that rearwardly extending arm portions 143 can be formed on all of the arms 17 so as to carry the supporting plate 62 a considerable distance rearwardly from the vertical plane of the spar, said sheet 42 being shown as terminating at 144 at the rear end of the arm 143 where it can be secured as by suitable means, not shown. The lower sheet 63, also shown as smooth (non-corrugated) is attached to the lower arm 18 as previously described, said sheet 63 terminating at a flanged portion 145 at the rear end of the arm 18. The sheets 62 and 63 have, as in the previously described arrangement, overlapped non-attached portions 146 near the connecting pivot 28 of the arm 17 and 18.

For securing the rearward ends of the flexible blanket, indicated in Fig. 12 at 150, to the fixed wing structure a series of brackets generally indicated at 151 are secured to the rear side of the spar in substantially exactly the same manner as the control unit brackets 16 are secured. The brackets can be stamped out of sheet stock of light weight metal. Each bracket 151 has a lug 152 for engaging between the rearmost upper flange 134 and the web 130 of the spar, and a clamping and attaching piece 153 for securing the lower base portion of the bracket 151 to the lower spar head, as against the rearward flange 135 of said head. One cooperating clamping screw is shown at 154. The brackets 151 would be spaced along the spar as required and there need be no alignment with the control units, although approximate alignment can be secured.

The regular ribbing of the wing is left intact and secured as usual in metal wing frame constructions. Such regular ribbing is omitted from Fig. 12 to avoid confusing the illustrated parts.

The flexible blanket 150 is secured to all upper rearward portions 156 of the brackets 151 at the point of convergence of two fairly stiff strut portions 157 and 158 of the brackets 151. The strut 158 leads from the portion 156 obliquely downwardly to a portion 159 of the bracket where it joins the attached base of the bracket. The portions 156 and 159 are similarly formed to receive attaching strips 160 and 161 which may extend across several or all of the brackets 151 of each wing. The strips have main body portions 162 and tongues 163. The body portions forwardly abut shoulders 164 of the brackets 151 and the tongues 163 enter respectively overhanging and underhanging notches 165 and 166 in the portions 156 and 159 of the brackets. The rearward reinforced ends of the blanket 150 (see previous description of grommet construction) are secured to the attaching strips 160 and 161 as by screws, one of which is shown at 167 holding the strip 160 in place, the other being omitted in order more clearly to show the lower attaching strip. The screws can be of the self-threading type; and, assuming the brackets 151 are made of relatively soft metal such as duralumin, smooth holes can be made in the bracket as at 168 for penetration by the threaded tapered portions of the screws.

With the arrangement described above, due mainly to carrying the upper blanket attachment and parts of its under-surface support (143 and bridge plates) considerably rearwardly from the forward spar, it is apparent from the broken line indication of one of the arms 143 and of a portion of the blanket 150 that there is practically no disturbance of the airfoil form when the arm and plunger assemblies of the control units are moved fully to their forwardly extended and camber-increasing positions.

Fig. 12 also illustrates a suggestive composite formation of the blanket 150, particularly in that the portions of the blanket 150 extending forwardly from the attaching strips 160 and 161 may be made non-extensible although flexible as, for example, forwardly to the points indicated at 150a and 150b or such other points as found most desirable from the standpoint of de-icing and from the standpoint of strengthening the portions of the blanket which, in the particular arrangement shown, would bridge across from the fixed to the movable wing structures, maintaining surface continuity in the extended positions of the control units. The portions of the blanket 150 from such points as 150a and 150b rearwardly to the attachments can be rendered non-stretchable or nearly so by embedded fabric or cord elements 170 and 171 or in any other suitable way. Such embedded fabric or cord structure usually would be incorporated with the attaching or grommet strips in the rear ends of the blanket. Other portions of the blanket then shown as reinforced or made non-extensible can be similarly treated so as to localize the stretch of the blanket to portions of the airfoil which, in various designs of airfoil wing sections that may be used, are found especially likely to accumulate ice and sleet. In the particular wing form shown it is assumed that ice tends to form near the leading edge and for a short distance back, top and bottom.

One manner of controlling the movable elements of the units 15—in other words the interconnected arm assemblies 17, 18—is illustrated by Fig. 13. The end sections 52 of the fluid tubing leading to the various units 15 are connected as shown to actuator hydraulic cylinders 80 which can be identical and with non-rotating pistons 71 mounted therein as for movement by screws 82 centrally of the cylinders 80 and properly mounted in end portions of the cylinders. The two screws are interconnected by gearing which may comprise two gears 83 in constant mesh with a driving pinion 84. The pinion is turned by a reversible electric motor 85 mounted in fixed position with relation to the cylinders 80.

Electrical leads 86 and 87 from the motor are used interchangeably to supply current to the motor for effecting forward and reverse rotation of the motor. The motor has the usual ground lead 88.

Power is supplied to the leads 86 and 87 from a power source 89 through two hand operable "snap" type switches, one of which, indicated at 90, is shown in position to connect the power source alternately to the "forward" and "reverse" leads 86 and 87 through the other switch 91 whose setting determines which operating direction of the motor will obtain. A line 92 from the power source is connected to a central terminal 93 of the switch 90 and the operating or contactor element 94 of said switch may assume an off position intermediately of two active positions, one of which (that illustrated) connects the line 92 with a line 95 leading to the switch 91. The switch 91 has a similar contactor element 96 to which the line 95 is connected as through a pair of parallel resistance thermal elements 97 and 98. The contactor element 96 in one of its "on" positions makes connection at 99 establishing power to the "forward" lead 86 of the motor. With the switch 91 closed as just stated, the operator may continue energization of the motor until the pistons 81 have forced fluid serially into the various pipes 51, 52 until the control unit airfoil section assemblies are fully extended or forward position as shown in Fig. 3 or he may stop the assembles in any intermediate position between that of Fig. 2 and that of Fig. 3 by operation of the contactor 96 as will be evident.

If the operator leaves the switch 91 in its "forward" circuit closing position (contact 99) the stop 37, Figs. 2 and 3, will eventually make contact with the abutment 40, whereupon the resistance element 97 will operate to move the switch contactor 96 to "off" position stopping the motor. If the contactor 96 is moved manually from "off" position to a position closing a circuit at contact 100, power will then be supplied through a line 101 to the "reverse" lead 87 of the motor causing the motor to run in the reverse direction and allowing fluid to move from the unit cylinders 44 back into the actuator cylinders 80. Thereupon the elastic blanket 60 assisted by the suction on the fluid in the system through reverse operation of the pistons 81 will return the control unit assembles toward the initial position as illustrated by Fig. 2. If the operator does not after initiation in "reverse" direction operate the switch 91 to "off" position (that illustrated) and the stop 37 engages the abutment 39, the thermal resistance element 98 will operate automatically to move the snap switch contact 96 to "off" position, stopping the motor. The motor remains stopped until restarted by the pilot. Obviously, the operator simply by controlling the contactor 96 can cause rapid simultaneous movement of the control unit assemblies to any position intermediate full forward or full rearward strokes and maintain the desired positions of the unit assemblies by subsequent movement of the switch contactor 96 to "off" position.

For de-icing, it is apparent that the operator can control the operation of stretching and unstretching the blanket 60 simply by operating the switch contactor 96 alternately from "forward" to "reverse" positions. It is desirable that, once the de-icing operation has started, a reciprocating movement of the assembly will be caused to continue so long as the condition demanding de-icing obtains. The electrical arrangement includes provision for shunting power around the normal circuit paths as by operation of the switch contactor 94 to "de-icing" position in which said contactor engages a terminal 103 of the switch 90. Thereupon the line 95 is de-energized and current flows through a line 104 to a pivoted contactor 105 of a snap switch 106. The contactor 105 automatically makes alternate contact at 107 and 108 and has no sustained "off" position. In the position of the contactor 105 shown the current from the line 104 is supplied to a line 109 and thence to the "forward" driving lead 86 of the motor. In the other position "reverse" driving obtains, as is obvious.

During automatic de-icing, the contactor 96 of the switch 91 is preferably left in the "reverse" position, so that upon cessation of the automatic operation the control units can be moved to retracted position as soon as the switch 94 is set for "normal wing control."

To operate the switch contact 105, a tail screw 110 is shown as drivingly connected to the motor. A non-rotatable nut or follower 111 on the screw is moved back and forth as the motor turns, respectively, in opposite directions. The follower 111 has pivoted thereto a tube 112 and the tube telescopes an arm 113 pivoted at 115 as on the casing of the switch 106. An extension of the arm 113 beyond the pivot carries an abutment 116 for operating contact with opposite ends of the contactor 105.

It is apparent from Fig. 13 that, with the contactor 94 in the "de-ice" position, current will be supplied alternately to the leads 86 and 87 of the motor as the follower or nut 111 travels back and forth within short limits on the screw 110. While the travel of the follower 111 in order to operate the switch contactor 105 for alternate forward and reverse motion of the motor is limited, considerably greater travel of the follower than necessary to operate the switch contactor 105 for normal operation of the airfoil control assembly is permitted by the sliding connection between the telescoping arms 112 and 113. If, for example, the follower 111 is moved in the "forward" direction beyond the position in which the contactor 105 is reversed from the position shown to that which supplies current for reverse driving of the motor, the follower 111 will simply travel idly toward the motor. Under such circumstances the contactor 94 of the switch 90 remains in the position illustrated, hence no current will be controlled by the automatic reversing contactor 105 and cannot be so controlled until the follower is moved back to one of its normal operating positions and the switch 90 is reset for automatic de-icing. When the airfoil lift and speed control assembly is retracted, the contactor 105 would ordinarily be left in the "forward" driving position; so that, if the wing is in a short chord condition at the time de-icing is required, the movement of the switch contactor 94 of the switch 90 to "de-ice" position is all that is required to initiate the automatic de-icing operating which then continues without requiring further attention by the pilot or operator.

I claim:

1. In an airfoil, a leading edge section having upper and lower parts, means positively pivotally connecting the parts directly adjacent a nose portion of the section, means to project the first mentioned means to change the chord of the airfoil, and means operated as a consequence of such projection and upon one of said parts to change the effective depth or thickness of a forward portion of the airfoil.

2. In an airfoil, an upper, curved, forward lift-surface-carrying member extending rearwardly from the leading edge of the airfoil, hinge means pivotally supporting said member directly adjacent the leading edge, adjusting means inside the airfoil operatively connected to the hinge means of said member for extending the leading edge of the airfoil beyond its normal position, and cooperating means acting concurrently to swing a trailing portion of said member upwardly about the hinge axis to vary the effective camber of the airfoil.

3. An airfoil having upper and lower substantially rigid airfoil, skin surface-supporting portions movable concurrently toward and away from a fixed rearward portion of the airfoil to change the chordal length of the airfoil and separable from and movable toward each other in a manner to maintain a desired ratio between mean chord and effective camber as said chord length is changed, and hinge means positively interconnecting said portions together at the leading edge of the airfoil.

4. An airfoil lift and speed control comprising a generally movable leading airfoil section with effectively rigid skin supporting parts arranged to be projected forwardly from and rearwardly toward the fixed airfoil section and relatively separable from and movable toward each other in a manner to increase and decrease the depth or thickness of the forward portion of the airfoil, said parts constituting separate units distributed along the leading edge of the airfoil, a flexible blanket extending in a taut loop around said movable section from the upper to the lower forward limits of the fixed airfoil section and substantially contiguous to camber and thrust surface portions of the fixed section for unbroken guidance of air currents, and bridge sheets extending between adjacent units and supported thereby to hold the blanket in airfoil form.

5. The arrangement according to claim 4 wherein the bridge sheets are secured to the units in a manner to enable the airfoil to flex in a direction transverse to its chord without tending to strain or buckle the bridge sheets.

6. A lift and speed control for an airplane wing of airfoil form, comprising a leading edge portion for the airfoil including parts movable relative to each other in a plane extending longitudinally of the wing and intersecting both lift and thrust surfaces of the airfoil, an inclined trackway on a fixed portion of the wing extending therefrom toward the leading edge, a follower on one of said relatively movable elements engaging the trackway, and means operatively connected to said movable elements to move them bodily forward and cause the trackway through said follower to spread said movable elements relatively apart.

7. In an aircraft wing of airfoil shape, a longitudinal forward spar, a series of parallel, forwardly extending brackets connected with said spar, unitary assemblies movably carried by the brackets and providing substantially rigid supports for leading edge, lift and thrust airfoil surfaces, mechanism carried by the brackets and connected to the assemblies for moving the same relative to the spar in a manner to adjust the lift and speed characteristics of the wing while maintaining at all times an efficient ratio between chord and camber of the wing, and a flexible airfoil cover means looped about said rigid supports and extending from an attaching means supported at least in part by an upper portion of the spar to an attaching means similarly supported by a lower portion of the spar.

8. An airfoil lift and speed control and de-icer, wherein a leading edge portion of the airfoil is arranged to be moved in a manner positively to change the airfoil section, hence controllably to affect the lift characteristics and simultaneously to cause surface movement tending to loosen accumulations of ice if present thereon, manually controllable means to cause progressive movement of said portion for lift and speed control, and automatic means acting thereon to cause repeated reciprocating movement of said leading edge portion for de-icing.

9. Mechanism according to claim 8 wherein the control includes a reversible electric motor and an automatic repeat switch mechanism driven thereby and operable for short reciprocal strokes of said leading edge portion, the drive between the motor and switch including means whereby the performance of longer strokes governed manually will be enabled without disturbing said drive.

10. An airfoil lift and speed control for aircraft wings, comprising a projectable airfoil leading edge portion, a relatively trailing fixed airfoil portion, an extensible loop of flexible strip material extending from the fixed portion and maintained in tension in contact with upper and lower portions of the leading edge portion, non-flexible means for supporting an upper part of the flexible strip on the projectable portion, which means extends rearwardly therefrom into overhanging relation to said fixed portion for a considerable distance, and means for attaching the upper rearward end of said strip to the fixed portion still farther rearwardly and substantially flush with the adjacent camber surface of said fixed portion.

11. An airfoil lift and speed control including a projectable leading portion of the airfoil having upper and lower skin surfaces and a flexible, extensible sheet looped thereabout from and secured to a fixed relatively trailing airfoil portion, means on said leading portion positively supporting the loop, and other means supportingly underlying a portion of the loop and bridging the fixed and projectable airfoil portions during projection of the leading portion.

12. In an airfoil having a movable leading portion and a relatively fixed trailing portion carrying the leading portion, a flexible blanket looped about the leading portion from the fixed portion, an airfoil-surface-constituting part of the blanket being elastic and stretchable and another airfoil-surface-constituting part thereof being substantially non-stretchable.

13. In an airfoil, separable body sections constituting leading and trailing airfoil surface sustaining portions, a flexible blanket looped about the leading portion, said blanket having an elastic stretchable portion intermediately of its ends and substantially non-stretchable portions adjacent its ends.

14. An aircraft airfoil having a skin surface, and a controllable substantially rigid upper and lower skin-surface-maintaining means which acts positively in all positions to maintain wing contour with the skin surface substantially continuous, to vary the chord of the airfoil and correspondingly the depth or thickness of a portion of the airfoil adjacent the leading edge, whereby accurately and positively to vary the lift characteristics while maintaining the chord and effective camber in efficient ratios for sustained and stable flight.

15. An aircraft wing airfoil having a main rear airfoil portion with substantially rigid upper and lower skin-surface-maintaining means thereon, a controllable front airfoil portion with substantially rigid but relatively movable upper and lower skin-surface-maintaining means of less upper and lower area than the corresponding area of the rear airfoil portion, mechanism supported by said main airfoil portion, operatingly connected with said upper and lower relatively movable substantially rigid means and operable to effect bodily forward movement thereof and also upward projection of an upper substantially rigid skin-surface-maintaining portion of said second mentioned means, said airfoil including flexible gap-closing cover means bridging the upper rigid skin-surface-maintaining means of the main and controllable airfoil portions in all positions of adjustment of the latter portion.

16. A lift and speed control for an airplane wing of airfoil form having a fixed rear part and movable hollow front part, said control comprising a series of hydraulic servo-motor units spaced along the airfoil within the front part but supported wholly by the rear part and projecting toward the leading edge of the wing, mechanism operatively connected with said hydraulic units and arranged to move lift and thrust surface portions of said front part forwardly and in a manner to separate said lift and thrust surfaces of said front part, and means to supply said hydraulic units serially with operating fluid under pressure.

CLIFFORD J. LEUTHOLT.